(12) United States Patent
Medaglia et al.

(10) Patent No.: US 11,079,959 B2
(45) Date of Patent: Aug. 3, 2021

(54) MIGRATION OF MEMORY DEVICES

(71) Applicant: HEWLETT-PACKARD DEVELOPMENT COMPANY, L.P., Spring, TX (US)

(72) Inventors: Diego Rahn Medaglia, Porto Alegre (BR); Anellena Santos, Porto Alegre (BR); Taciano Perez, Porto Alegre (BR); Kimon Berlin, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 549 days.

(21) Appl. No.: 16/076,196

(22) PCT Filed: Jul. 12, 2017

(86) PCT No.: PCT/US2017/041658
§ 371 (c)(1),
(2) Date: Aug. 7, 2018

(87) PCT Pub. No.: WO2019/013775
PCT Pub. Date: Jan. 17, 2019

(65) Prior Publication Data
US 2021/0181964 A1   Jun. 17, 2021

(51) Int. Cl.
*G06F 12/00* (2006.01)
*G06F 3/06* (2006.01)
(Continued)

(52) U.S. Cl.
CPC .......... *G06F 3/0647* (2013.01); *G06F 3/0604* (2013.01); *G06F 3/067* (2013.01);
(Continued)

(58) Field of Classification Search
CPC .... G06F 3/0647; G06F 3/0604; G06F 3/0622; G06F 3/0659; G06F 3/067; G06F 3/0683; G06F 21/602; G06F 21/78
See application file for complete search history.

(56) References Cited

U.S. PATENT DOCUMENTS

| 8,458,391 B2 * | 6/2013 | Itoh ....................... G06F 3/0665 711/4 |
| 8,775,861 B1 | 7/2014 | Raizen et al. |

(Continued)

FOREIGN PATENT DOCUMENTS

| EP | 2207123 A2 | 7/2010 |
| WO | WO-2004046971 | 6/2004 |

(Continued)

OTHER PUBLICATIONS

"Virtual Machine Storage Migration Overview", Retrieved from Internet—https://technet.microsoft.com/en-us/library/hh831656(v=ws.11).aspx, Nov. 1, 2013, 2 Pages.

*Primary Examiner* — John A Lane
(74) *Attorney, Agent, or Firm* — HP Inc. Patent Department

(57) ABSTRACT

A computing device that includes a plurality of memory devices and firmware to provide a migration data storage option that reserves a portion of a memory device to store, at least, encrypted metadata describing the physical layout information of the memory devices in preparation for migration of the memory devices.

15 Claims, 6 Drawing Sheets

(51) Int. Cl.
*G06F 21/60* (2013.01)
*G06F 21/78* (2013.01)

(52) U.S. Cl.
CPC .......... *G06F 3/0622* (2013.01); *G06F 3/0659* (2013.01); *G06F 3/0683* (2013.01); *G06F 21/602* (2013.01); *G06F 21/78* (2013.01)

(56) References Cited

U.S. PATENT DOCUMENTS

| | | | |
|---|---|---|---|
| 9,426,147 | B2 | 8/2016 | Smith et al. |
| 9,971,548 | B1 * | 5/2018 | Talwar ................. G06F 3/0647 |
| 2006/0064560 | A1 | 3/2006 | Mizuno et al. |
| 2006/0112265 | A1 | 5/2006 | Huynh et al. |
| 2006/0155773 | A1 | 7/2006 | Drouet et al. |
| 2014/0365785 | A1 | 12/2014 | Deforest et al. |
| 2015/0244559 | A1 | 8/2015 | Sakthikumar et al. |
| 2016/0294549 | A1 | 10/2016 | Qian |
| 2016/0340136 | A1 * | 11/2016 | Li ........................... B65H 7/02 |
| 2017/0160936 | A1 | 6/2017 | Chinnakkonda et al. |

FOREIGN PATENT DOCUMENTS

| | | |
|---|---|---|
| WO | 2015142970 A1 | 9/2015 |
| WO | WO-2016175856 | 11/2016 |

\* cited by examiner

MIGRATION OF MEMORY DEVICES

BACKGROUND

Random-access memory (RAM) is a form of data storage device associated with a computing device that stores frequently used program instructions during operation of the computing device. In some examples, this RAM may be non-volatile meaning that the RAM data storage device retains its content even when electrical power is removed from the non-volatile RAM. These non-volatile RAM data storage devices may also be implemented as dual in-line memory modules.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
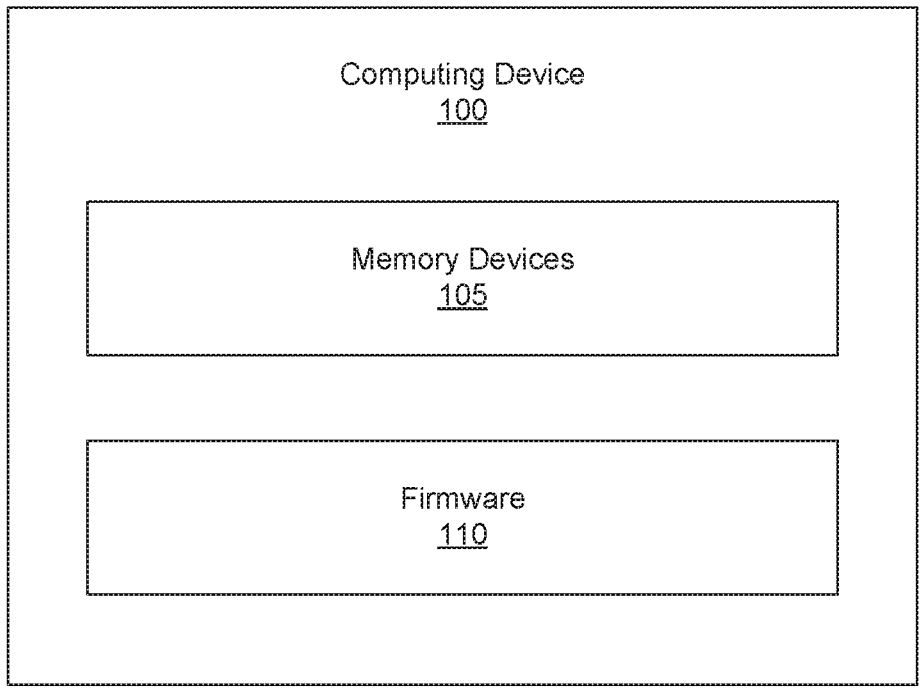
FIG. 1 is a block diagram of a computing device according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A myriad of different data storage devices may be used in connection with a computing device. As mentioned above, these data storage devices may include non-volatile memory devices that implement dual in-line memory in the form of a no-volatile dual in-line memory module (NVDIMM). Computing devices may include multiple NVDIMMs. However, each NVDIMM may implement separate and individualized passphrases to be unlocked at boot time of the computing device in order to enable operation of the computing device.

The passphrase associated with each of the NVDIMMs may be managed using a platform firmware (FW) executed by the computing device and on behalf of the user. Such implementation binds the NVDIMMs to that particular computing device. This may be referred to as transparent passphrase management. However, the methods used in connection with transparent passphrase management may limit the ability of a user to migrate any of the NVDIMMs across different computing devices.

Additionally, NVDIMMs may be communicatively coupled to the platform of the computing device and configured in different ways to perform different functions on the computing device. Examples of specific computing device-specific configurations may include partitioning the NVDIMMs for different uses, such as a block-oriented partitions or byte-addressable partitions, NVDIMM interleaving, block translation tables, among other configurations. The information regarding the computing device-specific configurations is maintained by the platform FW, and stored in a label area on the NVDIMMs' themselves. The label area is a metadata area that includes some of the layout settings for a set of NVDIMMs. However, this metadata is limited to informing the user that the current configuration is or is not valid for operation. If an NVDIMM is missing from an interleave set, for example, the user would not know which NVDIMM is supposed to added to the computing device. Migration data, is therefore, not maintained by the NVDIMMs or the computing device. Consequently, if a user moves any of the NVDIMMS across different computing devices, all that information will not be migrated with them, and the data on the device(s) will no longer be accessible.

The present specification describes a computing device that includes a plurality of memory devices and firmware to provide a migration data storage option that reserves a portion of a memory device to store, at least, encrypted metadata describing the physical layout information of the memory devices in preparation for migration of the memory devices.

The present specification further describes a memory device migration method that includes receiving, at a computing device, a request to migrate at least one memory device; creating, using firmware of the computing device, migration metadata describing a physical layout of the memory device, and at least one passphrase to access data in the memory device; and storing the migration metadata in a storage device transferrable to a target computing device.

The present specification describes a system for migrating memory devices that includes a source computing device with at least one memory device, a target computing device, and at least one interface associated with the source computing device to: receive a selection of the at least one memory device to be migrated, create a migration metadata describing physical layout information of the at least one memory device, and store the migration metadata to a transferable memory device communicatively coupled to the source computing device.

As used in the present specification and in the appended claims, the term "firmware" is meant to be understood as the computer usable program code and/or hardware used to operate a computing device and/or manipulate data.

Additionally, used in the present specification and in the appended claims, the term "as a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a block diagram of a computing device (100) according to an example of the principles described herein. The computing device (100) may include a plurality of memory devices (105), and firmware (110) to provide a migration data storage option that reserves a portion of a memory device to store, at least, encrypted metadata describing the physical layout information of the memory devices in preparation for migration of the memory devices.

The computing device (100) may be implemented in an electronic device, Examples of these electronic devices include servers, desktop computers, laptop computers, personal digital assistants (PDAs), mobile devices, smartphones, gaming systems, and tablets, among other electronic devices. The computing device (100) may be utilized in any data processing scenario including, stand-alone hardware, mobile applications, through a computing network, or combinations thereof. Further, the computing device (100) may be used in a computing network, a public cloud network, a private cloud network, a hybrid cloud network, other forms of networks, or combinations thereof. To help achieve its desired functionality, the computing device (100) comprises various hardware components. Among these hardware components may be a number of processors, a number of data storage devices including the plurality of memory devices (105), a number of peripheral device adapters, and a number of network adapters. These hardware components may be interconnected through the use of a number of busses and/or network connections. In one example, the processor, data storage devices, peripheral device adapters, and a network adapter may be communicatively coupled via a bus.

The processor may include the hardware architecture to retrieve executable code from the data storage devices and execute the executable code. The executable code may, when executed by the processor, cause the processor to implement at least the functionality of receiving, at the computing device (100), a request to migrate at least one memory device; creating, using firmware of the computing device (100), migration metadata describing a physical layout of the memory device and at least one passphrase to access data in the memory device; and storing the migration metadata in a storage device transferrable to a target computing device, according to the methods of the present specification described herein. In the course of executing code, the processor may receive input from and provide output to a number of the remaining hardware units.

The data storage devices including and apart from the plurality of memory devices (105) may store data such as executable program code that is executed by the processor or other processing device. As will be discussed, the data storage device may specifically store computer code representing a number of applications that the processor executes to implement at least the functionality described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM).

Generally, the data storage device may include a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the computing device (100) enable the processor to interface with various other hardware elements, external and internal to the computing device (100). For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

The computing device (100) further includes a plurality of memory devices (105). In the present specification and in the appended claims, the term "memory device" is meant to be understood as those memory devices that are part of a memory device set with the memory device set being migrated collectively and respecting specific rules regarding their relative layout with respect to each other. The plurality of memory devices (105) may, therefore, share in the storage of data in the computing device (100).

In an example, the plurality of memory devices (105) may be interleaving non-volatile dual in-line memory modules (NDIMMs). In a number of the examples presented herein, the plurality of NVDIMMs' byte-addressable partitions are members of an interleave set. Although certain examples presented herein use the example of the plurality of memory devices (105) as NVDIMMs, this is merely meant as an example and is not to be limiting. The present specification, therefore, contemplates any type of memory device to be used as the plurality of memory devices (105).

As described above, a label area reserved on each of the plurality of memory devices (105) for metadata to be stored thereon. The metadata may include, among other metadata, physical and digital layout settings of each of the plurality of memory devices (105), their relative layout to each other, and passphrases to access data in the plurality of memory devices (105).

According to aspects of the present specification, additional encrypted metadata may further store passphrases used to obtain access to each of the memory devices after migration of the memory devices to a target computing device. In an example, each of the plurality of memory devices (105) comprise a metadata storing the passphrase. In an example, the metadata may be stored on an external data storage device communicatively coupled to the computing device (100).

The computing device (100) may further include firmware (110). The firmware (110) may have a number of purposes apart from control, monitoring, and data manipulation of and within the computing device (100). In an example, the firmware (110) may include computer usable program code that presents certain graphical user interfaces (GUIs) via a display device during booting of the computing device (100) and/or as an administrative tool. The GUIs may provide settings that allow a user to set passphrases to be used in connection with the plurality of memory devices (105). The firmware (110) may further provide to a user a GUI that allows the user to set a migration data storage option that reserves a portion of a memory device to store, at least, encrypted metadata describing the physical layout information of the plurality of memory devices (105) in preparation for migration of the plurality of memory devices (105). As an example, the encrypted metadata may include information regarding slot population rules such as which slot a first of the plurality of memory devices (105) is to be placed and which slot a second of the plurality of memory devices (105) is to be placed. As an example, the encrypted metadata may further include information regarding the partition interleave sets associated with the plurality of memory devices (105). For example, the encrypted metadata may include information that describes a first of the plurality of memory devices (105) having a one block-orientation partition and a one byte-addressable partition while a second of the plurality of memory devices (105) has one volatile-memory partition and one-byte-addressable partition with each of the first and second memory devices (105) being members of an interleave set.

The GUIs presented to the user via the firmware (110) may also allow the user to extract the passphrase and layout information associated with at least one of the plurality of memory devices (105) into an encrypted file that is passphrase protected. The encrypted can be encrypted using, for example, the CMS standard for passphrase protected encryption thus allowing for a wide variety of target computing devices to be capable of descripting the encrypted file after physical transfer of at least one of the plurality of memory devices (105) to the target computing device.

The GUIs provided by the firmware (110) may also provide a file destination prompt requesting a user to indicate where the encrypted file is to be saved in preparation for physical transfer of at least one of the plurality of memory devices (105) to the target computing device. In an example, the GUI may allow a user to save the encrypted file to each of the plurality of memory devices (105) themselves. Thus, after physical transfer of the plurality of memory devices (105) to the target device, the user may access the encrypted files from off the plurality of memory devices (105) themselves. In an example, the GUI may allow a user to save the encrypted file to a removable media device, such as a universal serial bus (USB) flash drive. This may allow compatibility with the plurality of memory devices (105) if and when the plurality of memory devices (105) cannot have the encrypted files written thereon.

During operation, the computing device (100), a user may interact with the firmware (110) and the respective GUIs described herein in preparation to physically transfer the plurality of memory devices (105) to a target computing device. As described, the user may cause that an encrypted file that describes the layout information of a selected number of the plurality of memory devices (105) and a passphrase to access that information be created. The use may then cause, via the firmware (110), the encrypted file to be saved either on the plurality of memory devices (105) themselves or onto a removable storage device. In an example, a single file per memory devices (105) may be created, but all files may have the same passphrase in order to simplify user experience.

Each encrypted and passphrase protected file may then be saved to the selected migration area whether it is on the individual memory devices (105) themselves or on the removable storage device described herein. In situations where the plurality of memory devices (105) are not immediately physically moved to the target device and the changes occur in connection with the operation or layout of the plurality of memory devices (105) in the computing device, those changes may be updated. In this example, the user may be prompted, via execution of the firmware (110), to provide the passphrase in order to update the encrypted files. In an example, however, the user may be simply notified that the migration files are being updated with the computing device (100) using the stored passphrase to automatically update the encrypted files transparently.

When the plurality of memory devices (105) are physically moved to a target computing device, the firmware associated with the target computing device may detect the plurality of memory devices (105). The encrypted file may then be read from the storage location on the plurality of memory devices (105) themselves or on the removable storage device. Once the encrypted files are accessed the user may provide the passphrase when prompted in order for the target computing device to gain access to the migration information, the layout information, and other data provided within the encrypted files described herein.

Either a subset of plurality of memory devices (105) or all of the plurality of memory devices (105) may be migrated from the computing device (100) to the target computing device. The target computing device may identify interleave sets that are complete and can function as well as those that are lacking associated sets. Once the firmware of the target computing device has access to the content encrypted files, it may check the layout information and see if it is compatible with the target computing device. If it is, the firmware of the target computing device will start managing the newly installed plurality of memory devices (105). In this case, the passphrases may be added to a secure storage device associated with the target computing device when that kind of management is available, Additionally, the encrypted file will be updated to the reflect the new layout of the plurality of memory devices (105) within the target computing device.

If the layout information is not compatible with the target computing device, the firmware of the target computing device may try to identify the cause and inform the user, via a GUI, to change the configuration of the plurality of memory devices (105) accordingly. In an example, this may be done by displaying a message on the screen, or writing to a log. For example, the firmware of the target computing device may suggest that the plurality of memory devices (105) should be placed on different slots in order support their current setup. These suggestions may be displayed in textual and/or graphical form via the GUI.

In this manner, a user may be capable of physically removing at least one of a plurality of memory devices (105) from the computing device (100) and successfully incorporate it into a target computing device. The process described herein allows the user to securely move the plurality of memory devices (105) that are password protected without having to disable their associated security protocols before doing so. The user is also provided with the ability to properly configure the plurality of memory devices (105) in the target computing device using the information related to the original layout of the plurality of memory devices (105) in the computing device (100). Additionally, the process described herein provides for a way to securely store the passphrases and layout information within the computing device (100), the encrypted files, and/or the target computing device. Further, the user is allowed to extract the information about the plurality of memory devices (105) without relying on how the firmware (110) encrypted such information. The user, with the passphrase, may gain access to the encrypted file and its information at any time and with any computing device: the computing device (100) or the target computing device.

Figure 2:
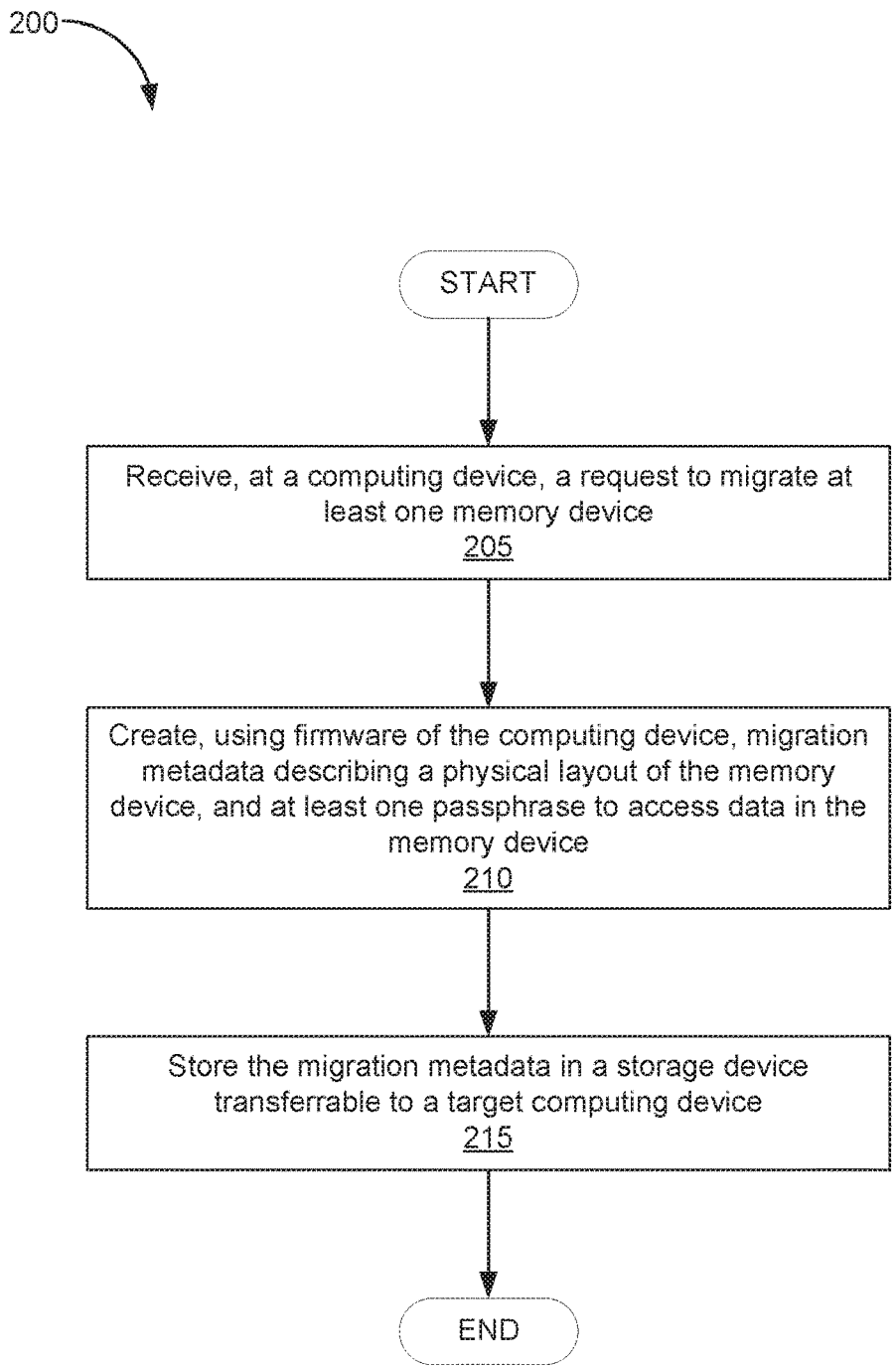
FIG. 2 is a flowchart showing a method for migrating a device according to an example of the principles described herein.

FIG. 2 is a flowchart showing a method (200) for migrating a device according to an example of the principles described herein. The method (200) may begin with receiving (205), at a computing device (FIG. 1, 100), a request to migrate at least one memory device (FIG. 1, 105). In an example, the firmware (FIG. 1, 110) associated with the computing device (FIG. 1, 100) may provide the user with a number of GUIs to accomplish the method (200) described herein. Thus, the request received (205) to migrate the at least one memory device (FIG. 1, 105) may be received as the user interfaces with these GUIs presented by the firmware (FIG. 1, 110).

The method (200) may continue with creating (210), using the firmware (FIG. 1, 110) of the computing device (FIG. 1, 100), migration metadata describing a physical layout of the memory device (FIG. 1, 105) and at least one passphrase to access data in the memory device (FIG. 1, 105). Again, a user may, through a GUI, cause the firmware (FIG. 1, 110) to create this metadata. The metadata may be created (210) in preparation for the physical migration of the at least one memory device (FIG. 1, 105) to a target computing device.

The method (200) may continue with storing (215) the metadata in a storage device that is transferrable to the target computing device. In an example, the metadata may be encrypted with the passphrase being used by the user to access the data before or after the physical migration of the at least one memory device (FIG. 1, 105). In an example, the storage device may be a partitioned portion of the at least one memory device (FIG. 1, 105). In an example, the storage device may be a removable storage device communicatively coupled to the computing device (FIG. 1, 100) and its firmware (FIG. 1, 110).

Figure 3:
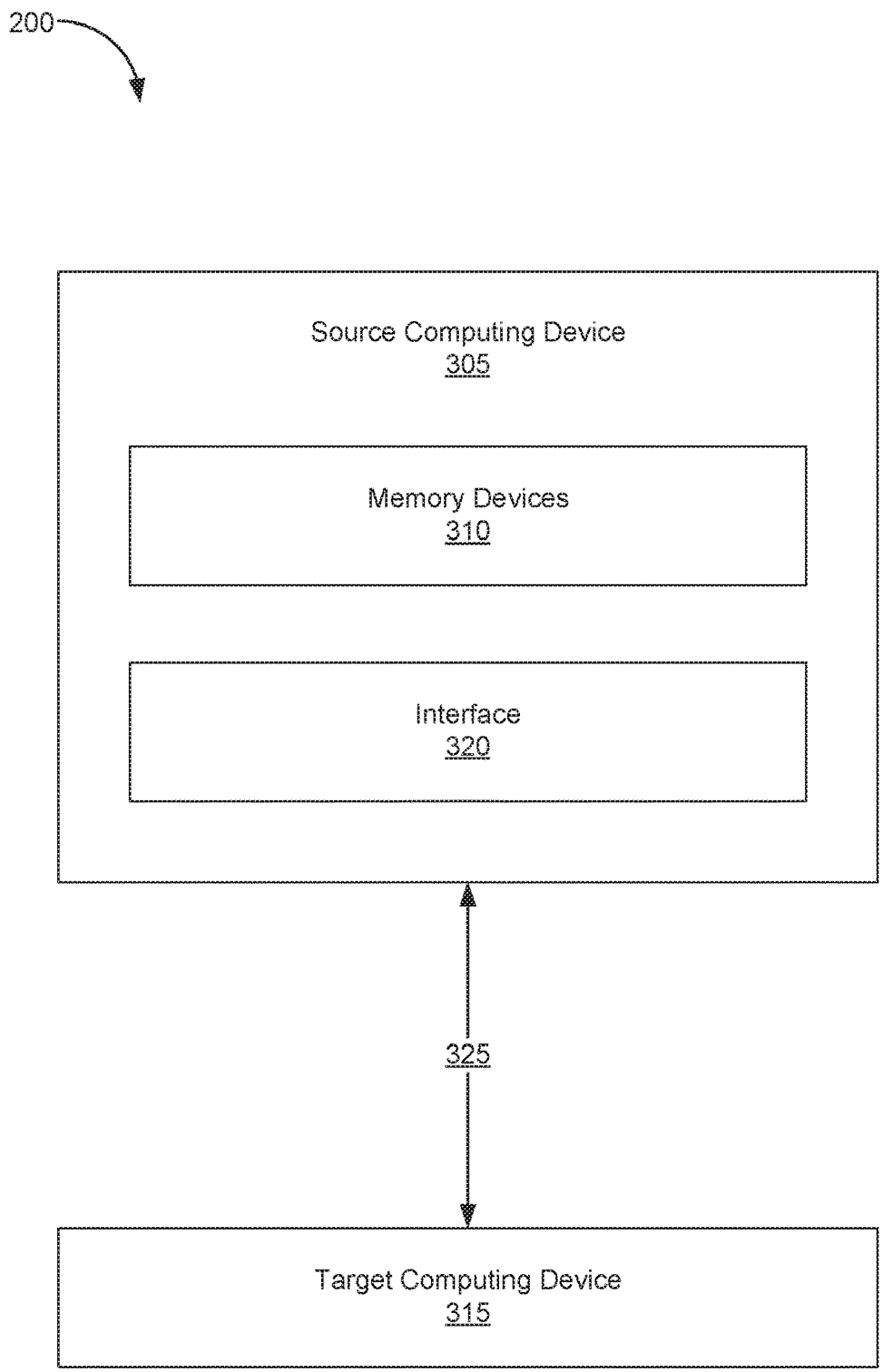
FIG. 3 is a block diagram of a system for migrating memory devices according to an example of the principles described herein.

FIG. 3 is a block diagram of a system (300) for migrating memory devices (310) according to an example of the principles described herein. The system (300) includes a source computing device (305) including at least one memory device (310). The system (300) further includes a target computing device (315) to which the at least one memory device (310) may be physically migrated to.

In order to allow for a complete physical transfer of the at least one memory device (310) from the source computing device (305) to the target computing device (315), the source computing device (305) may include an interface (320) executed by the firmware of the source computing device (305). The interface (320) may include the firmware (FIG. 1, 110) and peripheral devices that allow the user to make selections presented on a GUI by the firmware (FIG. 1, 110).

The user may, for example, access the interface (320) and its GUIs via a boot process or by some administrator protocol executed by a processor of the source computing device (305).

As described above, the interface (320) may present to the user a number of GUIs that allow the user to select a number of memory devices (310) in order to prepare those memory devices (310) for physical migration from the source computing device (305) to the target computing device (315). Upon selection of at least one memory device (310), the firmware (FIG. 1, 110) may cause that migration data be created. The migration data may include, among other data, at least the current layout of the individual memory devices (310), the partition interleave sets of each of the memory devices (310), and user selected passphrases to access the migration data. A single set of migration data may be created for each of the memory devices (310).

Once the migration data is created, it may be stored as an encrypted file with the passphrase later being used to successfully decrypt the encrypted file. The encrypted file may then be stored on the individual memory devices (310) themselves and/or a removable storage device communicatively coupled to the source computing device (305) and the firmware (FIG. 1, 110).

Again, during operation of the source computing device (305), when some aspect of any of the memory devices (310) changes, these changes may be updated in the encrypted file created. This may be done transparently by the source computing device (305) through use of the stored passphrase by the firmware (FIG. 1, 110).

During physical migration of the at least one memory device (310), the encrypted file may be read by the firmware of the target computing device (315). Again, the encrypted file may be located on the at least one memory device (310) and/or on the removable storage device that has also been physically migrated to the target computing device (315) and is in communication with the target computing device (315).

Upon access of the encrypted file, the firmware of the target computing device (315) may decrypt the encrypted file after the user has input the correct passphrase. As the firmware of the target computing device (315) reads the migration data, the firmware may present the user with indications as to whether the current layout of the memory devices (310) is compatible with the target computing device (315). If it is, the firmware of the target computing device (315) may so indicate to the user and the user may continue to operate the target computing device (315).

If the layout of the memory devices (310) is not compatible with the target computing device (315), the firmware of the target computing device (315) may present the user with a GUI textually or graphically indicating to the user how at least one of the memory device (310) may need to be adjusted.

Figure 4:
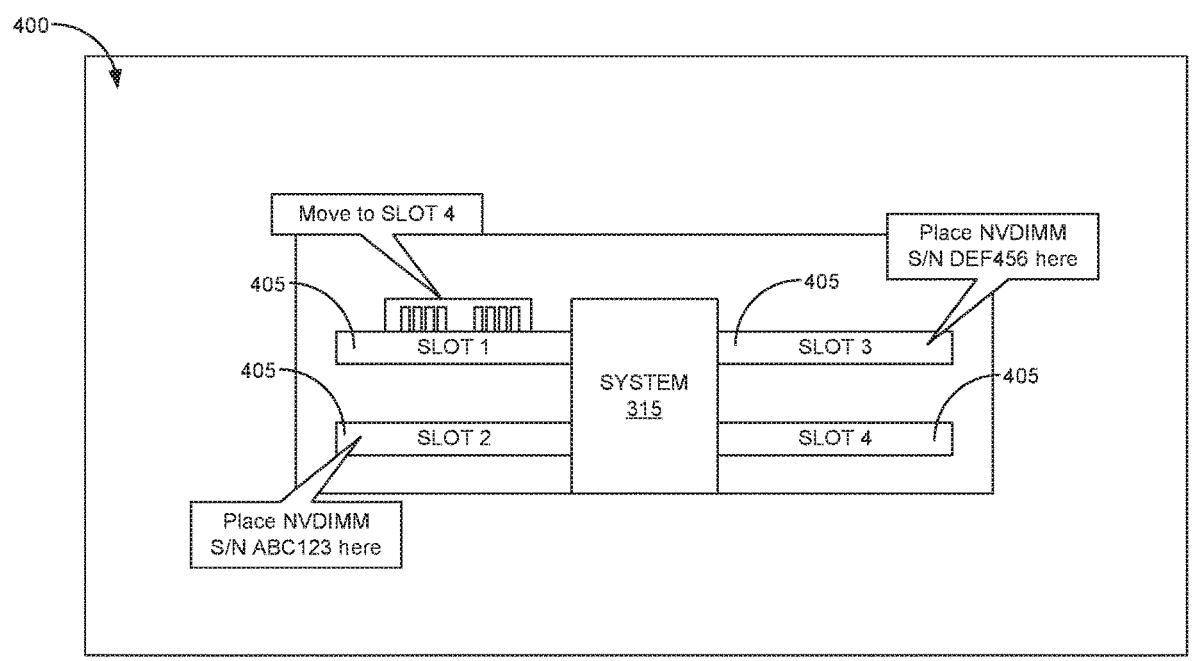
FIG. 4 is a graphical user interface presented to a user on the target computing device (315) according to an example of the principles described herein.

FIG. 4 is a graphical user interface (GUI) (400) presented to a user on the target computing device (315) according to an example of the principles described herein. The GUI (400) may include a graphic showing the physical representation of a number of slots (405) within the target computing device (FIG. 3, 315) into which at least one memory device (FIG. 3, 310) may be inserted. As the firmware of the target computing device (FIG. 3, 315) reads the migration data in the encrypted file, it may propose changes to the physical layout of the memory devices (310) as depicted. As an example, the firmware of the target computing device (315) may indicate that a misplaced memory device (FIG. 3, 310) is to be placed in another slot (405) with the target computing device (FIG. 3, 315). Additionally, the firmware of the target computing device (FIG. 3, 315) may indicate the serial number of a particular memory device (FIG. 3, 310) to be placed in a specific slot (405). The presentation of the GUI allows a user to easily physically migrate memory device (FIG. 3, 310) from the source computing device (FIG. 3, 305) to the target computing device (FIG. 3, 315).

Figure 5:
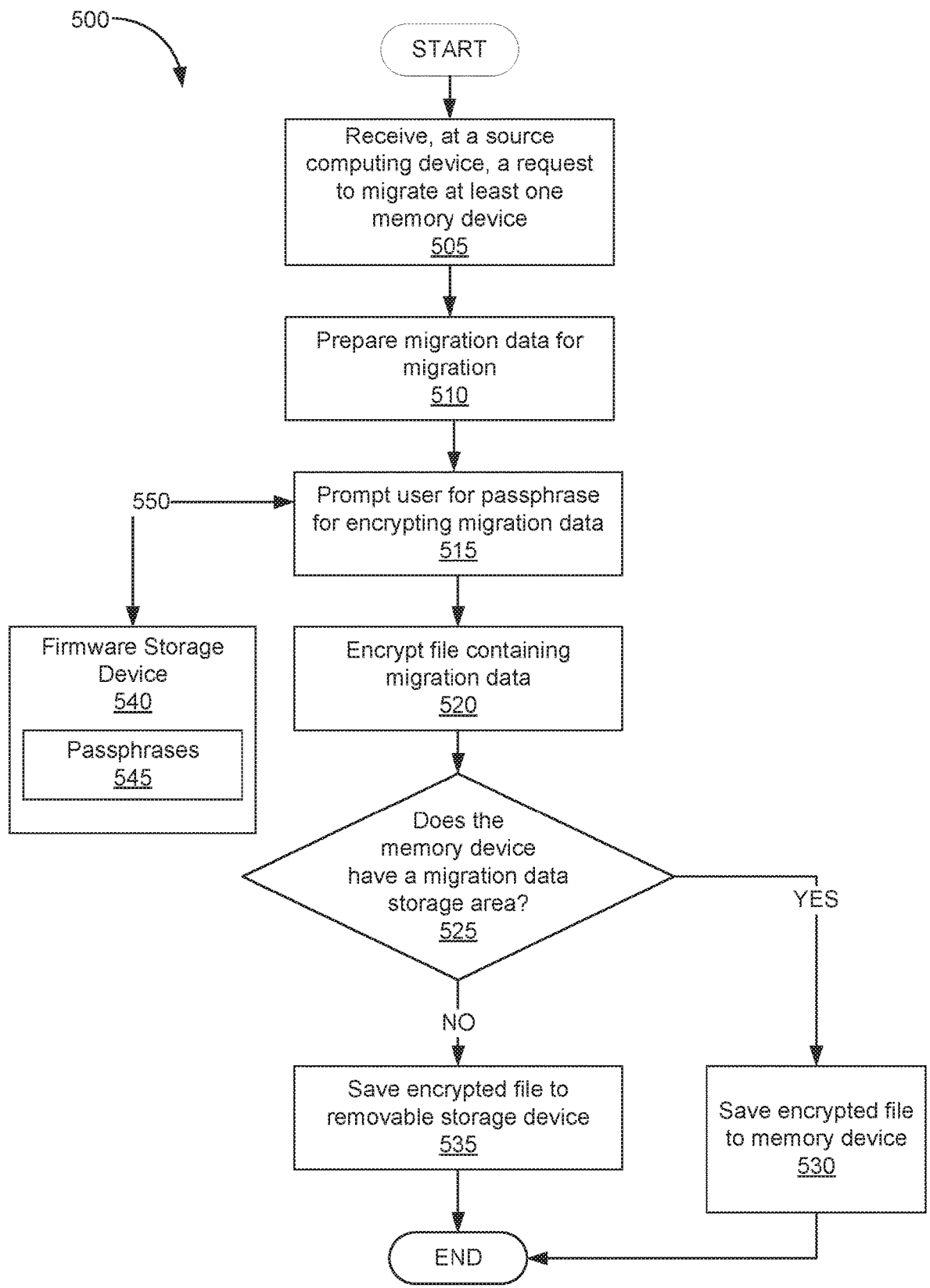
FIG. 5 is a flowchart showing a method of preparing a plurality of memory devices for migration according to an example of the principles described herein.

FIG. 5 is a flowchart showing a method (500) of preparing a plurality of memory devices (FIG. 3, 310) for migration according to an example of the principles described herein. The method (500) begins with receiving (505), at a source computing device (FIG. 3, 305) a request to migrate at least one memory device (FIG. 3, 310) from the source computing device (FIG. 3, 305). In preparation for the migration, migration data may be prepared (510) using the firmware (FIG. 1, 110) of the source computing device (FIG. 3, 305). The user may then be prompted (515) to create a passphrase used to encrypt and secure the migration data. In an example, the firmware (FIG. 1, 110) of the source computing device (FIG. 3, 305) may include a firmware storage device (540) that may maintain the passphrases (545) used to access the migration data either before or after the encryption (515) of the migration data.

The method (500) may continue with encrypting (520) the file containing the migration data. It may then be decided by the firmware (FIG. 1, 110) of the source computing device (FIG. 3, 305) whether the memory device (FIG. 3, 310) has a migration data storage area (Decision 525). If the memory device (FIG. 3, 310) does include a migration data storage area partitioned for such information (Decision YES, 525), then the encrypted file is stored (530) on the memory device (FIG. 3, 310). If the memory device (FIG. 3, 310) does not include a migration data storage area partitioned for such information (Decision NO, 525), then the encrypted file is stored (535) on a removable storage device communicatively coupled to the source computing device (FIG. 3, 305).

Figure 6:
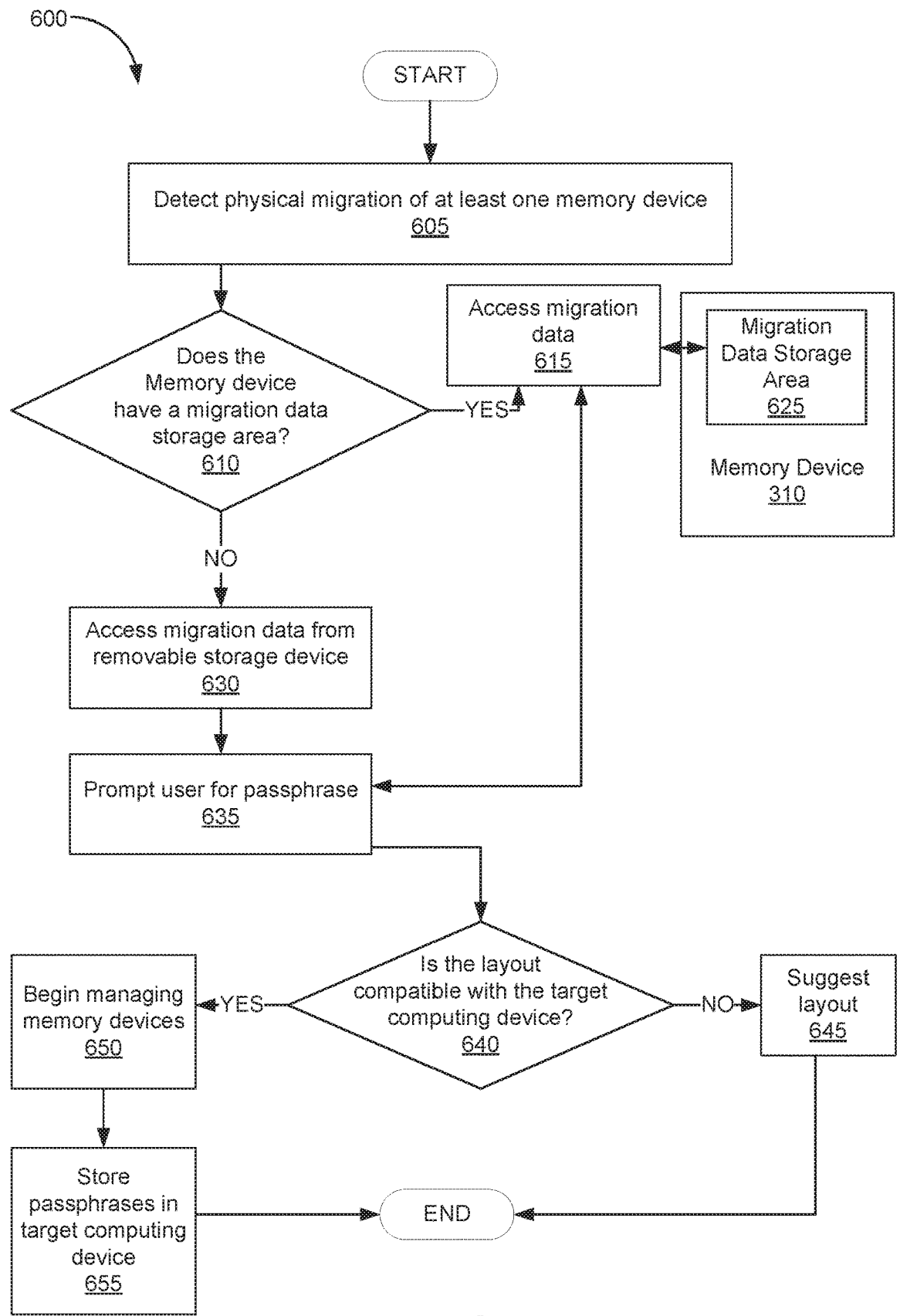
FIG. 6 is a flowchart showing a method of managing a plurality of newly migrated memory devices within a target computing device according to an example of the principles described herein.

FIG. 6 is a flowchart showing a method (600) of managing a plurality of newly migrated memory devices (FIG. 3, 310) within a target computing device (FIG. 3, 315) according to an example of the principles described herein. The method (600) may begin with detecting (605) the physical migration of the at least one memory device (FIG. 3, 310) in to the target computing device (FIG. 3, 315). This may be done by detecting a voltage drain at a slot within the target computing device (FIG. 3, 315) for example. Once the memory device (FIG. 3, 310) is detected (605), it may be determined wither the memory device (FIG. 3, 310) has a migration data storage area (Decision, 610). If it does (Decision YES, 610) the migration data is accessed (615) from the migration data storage area (625) of the memory device (FIG. 3, 310). If not (Decision No, 610), the migration data is accessed (630) form a removable storage device communicatively coupled to the target computing device (FIG. 3, 315).

The method (600) may continue with the firmware of the target computing device (FIG. 3, 315) prompting (635) the user for the passphrase. It may then be determined (Decision, 640) whether the layout of the detected memory device (FIG. 3, 310) is compatible with the target computing device (FIG. 3, 315). If it is not compatible (Decision No, 640), the firmware of the target computing device (FIG. 3, 315) suggests (645) a layout as described herein. If it is compatible (Decision YES, 640), the firmware of the target computing device (FIG. 3, 315) may begin managing (650) the memory device (FIG. 3, 310) and store (655) the passphrases in the target computing device (FIG. 3, 315).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, a processor of the source computing device (305), target computing device (315) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing device, comprising:
a plurality of memory devices; and
firmware to provide a migration data storage option that reserves a portion of a memory device to store, at least, encrypted metadata describing physical layout information of the memory devices in preparation for migration of the memory devices.

2. The computing device of claim 1, wherein the memory devices are interleaving non-volatile dual in-line memory modules (NVDIMMs).

3. The computing device of claim 1, wherein the encrypted metadata further store passphrases used to obtain access to each of the memory devices after migration of the memory devices to a target computing device.

4. The computing device of claim 3, wherein each of the memory devices comprise metadata storing the passphrase.

5. The computing device of claim 3, wherein each of the memory devices comprises encrypted metadata describing physical layout information of the memory devices.

6. The computing device of claim 1, wherein the portion of the memory device is on each of the memory devices.

7. The computing device of claim 1, wherein the portion of the memory device is on a removable data storage device communicatively coupled to the computing device.

8. The computing device of claim 1, wherein the encrypted metadata is encrypted using cryptographic message syntax.

9. A memory device migration method, comprising:
receiving, at a computing device, a request to migrate at least one memory device;
creating, using firmware of the computing device, migration metadata describing a physical layout of the memory device, and at least one passphrase to access data in the memory device; and
storing the migration metadata in a storage device transferrable to a target computing device.

10. The method of claim 9; wherein the transferrable storage device is the at least one memory device.

11. The method of claim 9, wherein the transferrable storage device is a removable storage device communicatively coupled to the computing device.

12. The method of claim 9, further comprising, at the target computing device,
   receiving a signal that the at least one memory device has been communicatively coupled to the target computing device;
   accessing the passphrases stored on at least one memory device to access the data in the migrated devices; and
   determining whether the physical layout of the memory device of the at least one memory device is compatible with the target computing device.

13. A system for migrating memory devices, comprising:
   a source computing device comprising at least one memory device;
   a target computing device; and
   at least one interface associated with the source computing device to:
      receive a selection of the at least one memory device to be migrated;
      create a migration metadata describing physical layout information of the at least one memory device; and
      store the migration metadata to a transferable memory device communicatively coupled to the source computing device.

14. The system of claim 13, wherein the migration metadata is stored on the at least one memory device.

15. The system of claim 14, wherein the target computing device further comprises firmware to detect the presence of the at least one memory device, access the migration metadata, determine whether the layout information is compatible with the target computing device and use the passphrase to access the data in the devices.

* * * * *